United States Patent [19]

Chaczyk et al.

[11] Patent Number: 4,887,930

[45] Date of Patent: Dec. 19, 1989

[54] MANUALLY CONTROLLED ADJUSTABLE LOCKING MECHANISM FOR A CABLE CONTROL SYSTEM

[75] Inventors: Adam W. Chaczyk, Allen Park, Mich.; Kelvin T. Brown, Toledo, Ohio

[73] Assignee: Babcock Industries Inc., Fairfield, Conn.

[21] Appl. No.: 273,259

[22] Filed: Nov. 18, 1988

[51] Int. Cl.[4] .............................................. F16B 7/10
[52] U.S. Cl. ................................... 403/379; 74/502.4; 403/104
[58] Field of Search .............. 403/377, 378, 379, 104; 74/502.4, 502.6, 527

[56] References Cited

U.S. PATENT DOCUMENTS

| 831,981 | 9/1906 | Partrick | 403/377 |
|---|---|---|---|
| 2,210,797 | 8/1940 | Crim | 403/377 |
| 3,145,720 | 8/1964 | Tokii | 403/104 |
| 3,662,617 | 5/1972 | Bennett et al. | 74/502.4 |
| 3,710,645 | 1/1973 | Bennett | 74/502.4 |
| 4,676,119 | 6/1987 | Spease | 74/502.6 |

Primary Examiner—Randolph A. Reese
Assistant Examiner—Carol I. Bordas
Attorney, Agent, or Firm—Barnes, Kisselle, Raisch, Choate, Whittemore & Hulbert

[57] ABSTRACT

A manually controlled adjustable locking mechanism for a cable control system comprising a housing having a rectangular opening extending therethrough and a telescoping member having a rectangular cross section extending into and guided by the opening of the housing. The telescoping member has opposed transversely extending sets of teeth on opposite internal sides and external sides thereof. The housing has a rectangular opening extending transversely and intersecting the first mentioned rectangular opening. The opposed sets of teeth extend downwardly at an angle from the opening. A locking member has a substantially rectangular cross section and is positioned within the transverse opening and is manually movable between a first locking position and a second unlocking position. The locking member has opposed sets of internal teeth adapted to engage the sets of teeth on the telecoping member in the locking position of the locking member and adapted to have the teeth thereon disengaged from the sets of teeth on the telescoping member in the second position thereof.

11 Claims, 4 Drawing Sheets

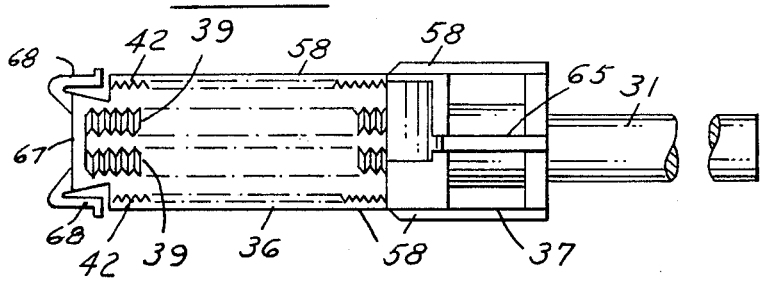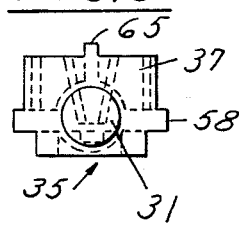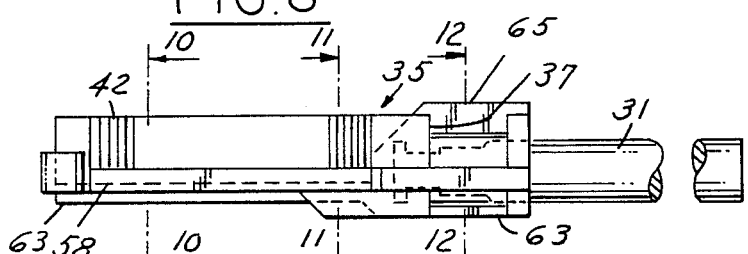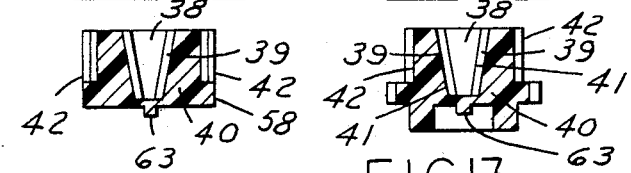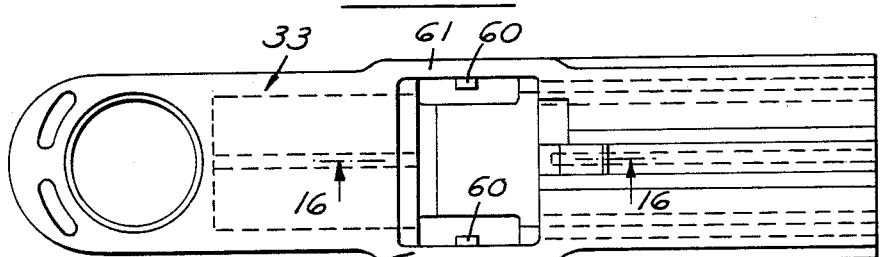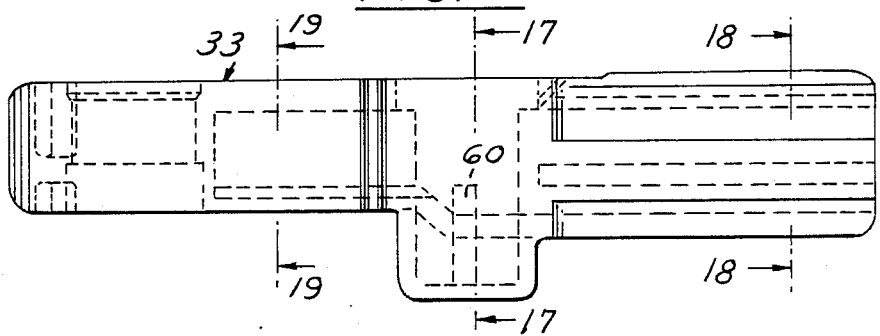

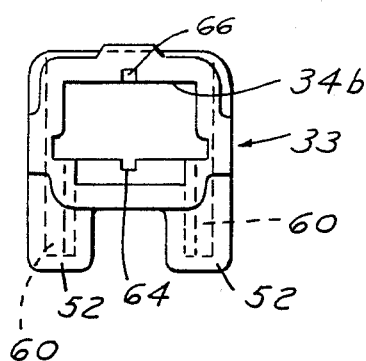
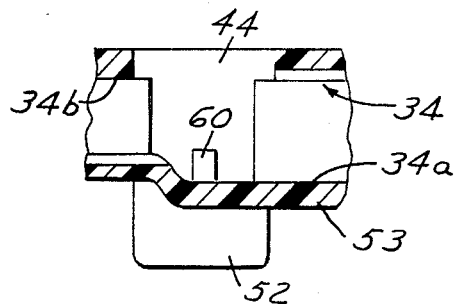
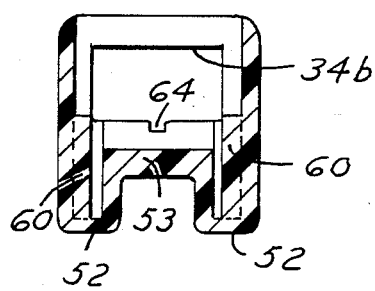
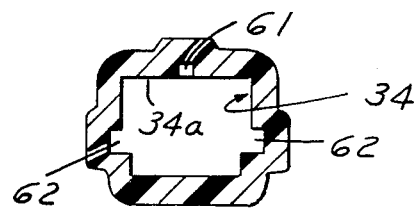
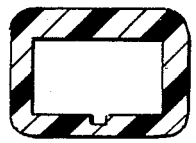
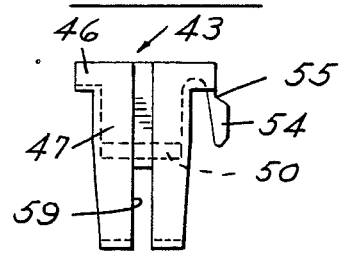
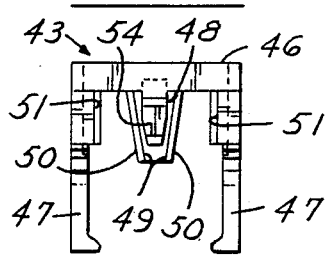
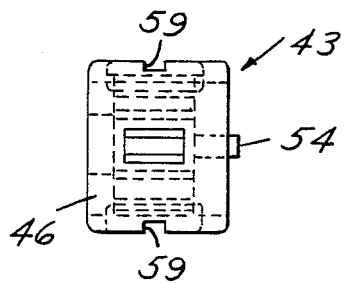

MANUALLY CONTROLLED ADJUSTABLE LOCKING MECHANISM FOR A CABLE CONTROL SYSTEM

This invention relates to manually actuated locking mechanisms for rapidly and directly adjusting a finite length between two points of a support or attachment and more particularly to such mechanisms for use in adjusting the length of a conduit or a cable in a cable control system comprising a conduit and a cable extending through the conduit.

BACKGROUND AND SUMMARY OF THE INVENTION

Various types of control systems have been heretofore provided for adjusting a finite length including the finite length of a control system which includes a conduit and a cable extending through the conduit. In such systems, it is important to be able to adjust the position to accommodate an installation as in an automobile wherein a conduit and cable control operates devices such as throttles, brakes and the like.

Heretofore, the mechanisms function to shorten or lengthen a cable or conduit through which the cable extends. A problem with such mechanisms is as the length is changed, the position of the cable or conduit is changed. When in a vehicle, for example, the environment of the vehicle may preclude such change in the position. Furthermore, accurate changes are therefore more difficult.

Among the objectives of the present invention are to provide an improved locking mechanism which is self-contained; which eliminates the need for any appendages; which is compact; which can be adjusted without the need for special tools; and which can accommodate noise and vibration by simple snap-on to an integral ball; which has minimal friction between parts; wherein all the adjustment is achieved beyond the cable or conduit; which is capable of high tensile strength; which is small and compact; and which does not become disassembled during shipment.

In accordance with the invention, the manually controlled adjustable locking mechanism for a cable control system comprising a housing having a rectangular opening extending therethrough and a telescoping member having a rectangular cross section extending into and guided by the opening of the housing. The telescoping member has opposed transversely extending sets of teeth on opposite internal sides and external sides thereof. The housing has a rectangular opening extending transversely and intersecting the first mentioned rectangular opening. The opposed sets of teeth extend downwardly at an angle from the opening. A locking member has a substantially rectangular cross section and is positioned within the transverse opening and is manually movable between a first locking position and a second unlocking position. The locking member has opposed sets of internal teeth adapted to engage the sets of teeth on the telescoping member in the locking position of the locking member and adapted to have the teeth thereon disengaged from the sets of teeth on the telescoping member in the second position thereof.

DESCRIPTION OF THE DRAWINGS

FIG. 7 is a plan view of the locking member utilized in the mechanism.

FIG. 8 is an elevational view of the locking member utilized in the mechanism.

FIG. 9 is an end elevational view of the locking member shown in FIG. 7.

FIG. 10 is a sectional view taken along the line 10—10 in FIG. 8.

FIG. 11 is a sectional view taken along the line 11—11 in FIG. 8.

FIG. 12 a sectional view taken along the line 12—12 in FIG. 8.

FIG. 13 is a plan view of the housing utilized in the mechanism.

FIG. 14 is a side elevational view of the housing.

FIG. 15 is an end elevational view of the housing taken from the right as viewed in FIG. 14.

FIG. 16 is fragmentary sectional view taken along the line 16—16 in FIG. 14.

FIG. 17 is a fragmentary sectional view on an enlarged scale taken along 17—17 in FIG. 14.

FIG. 18 is a fragmentary sectional view taken along the line 18—18 in FIG. 14.

FIG. 19 is a fragmentary sectional view taken along the line 19—19 in FIG. 14.

FIG. 20 is a side elevational view of the locking member utilized in the mechanism.

FIG. 21 is an end view taken from the right as viewed in FIG. 20.

FIG. 22 is a plan view of the locking member.

DESCRIPTION

Figure 1:
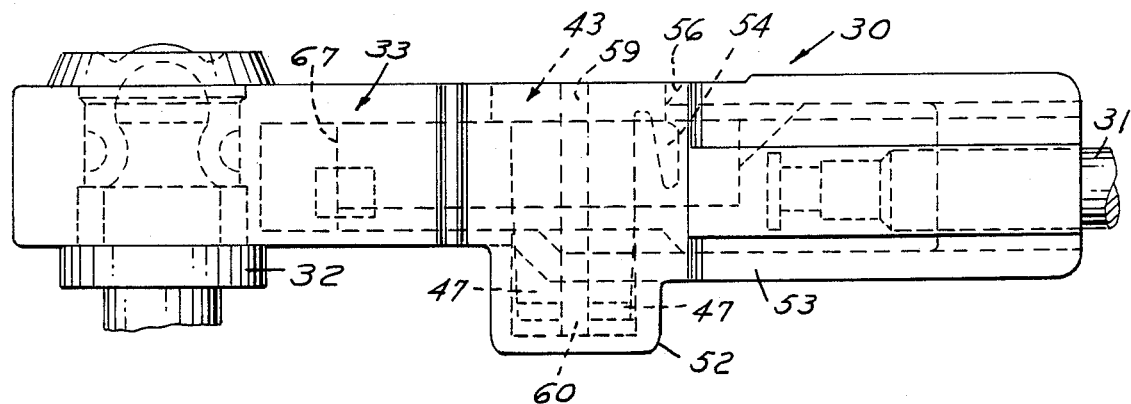
FIG. 1 is a side elevational view of a manually adjustable locking mechanism embodying the invention.
Figure 2:
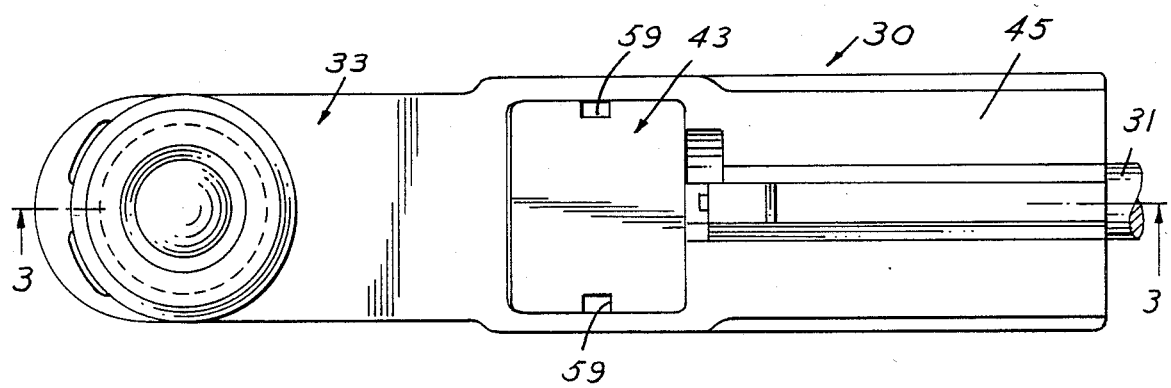
FIG. 2 is a plan view of the same.

Referring to FIGS. 1 and 2, the manually adjustable control mechanism 30 is adapted to be used with a rod 31 which is connected to a cable, not shown, and to a service ball 32 which may be connected, for example, to a lever such as a vehicle transmission lever for shifting gears. The control mechanism 30 comprises a plastic housing 33 having a longitudinally extending opening 34 which is rectangular in cross section including a first portion 34a having a greater vertical dimension than the portion 34b communicating with 34a (FIGS. 13-19). The adjusting mechanism 30 further includes a telescoping member 35 made of plastic (FIGS. 8-12) and comprising a first portion 36 having the general cross section of the portion 34b of opening 34 and a second portion 37 which has a cross section corresponding in rectangular configuration to the cross section of the portion of opening 34a. Telescoping member 35 includes a longitudinally extending groove 38 that has inclined sides 39 that converge to a base wall 40. Opposed sets of teeth 41 extend transversely of member 35 to define opposed sets of internal teeth that are inclined and converge toward wall 40. Telescoping member 35 also includes opposed sets of external teeth 42 that extend at a right angle to the bottom wall 40.

The mechanism 30 further include a plastic locking member 43 which is generally rectangular in cross section and extends through a rectangular opening 44 in the top wall 45 of the housing 33. The locking member 43 includes a top wall or flange 46, to facilitate engagement thereof and spaced side walls 47 (FIGS. 20-22). A projection 48 extends downwardly from wall 46 of the locking member and includes opposed sides 49 that are inclined downwardly and inwardly on which sets of external teeth 50 are provided for engagement with the internal teeth 41 on the telescoping member 35. The locking 43 further includes opposed sets of internal teeth 51 on the internal surfaces of walls 47 for engaging the teeth 42 on the telescoping member 35.

Figure 3:
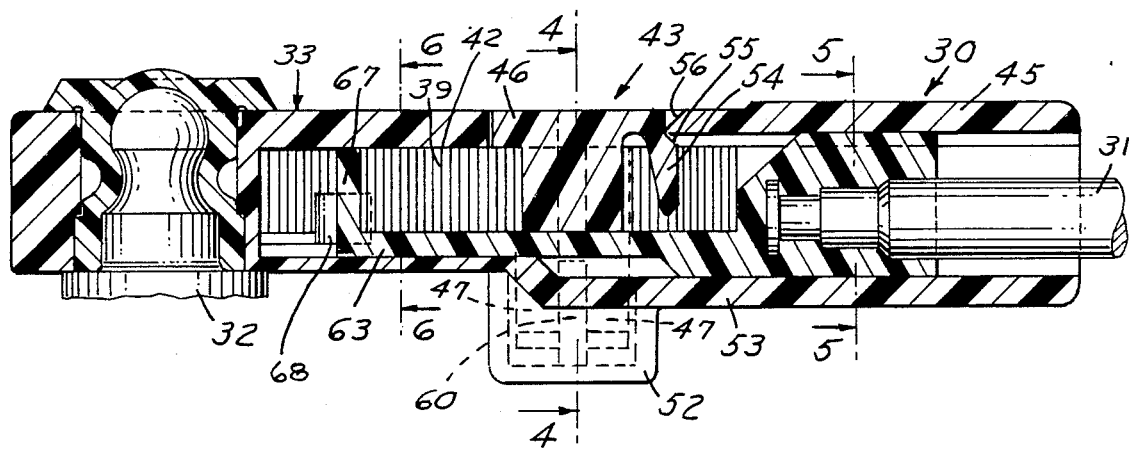
FIG. 3 is a sectional view taken along the line 3—3 in FIG. 2.

Housing 33 is provided with laterally spaced downwardly projecting cavities 52 that are formed in the bottom wall 53 of housing 33 into which the lower ends of walls 47 of locking member 43 project when the locking member 43 is in locking position. A flexible integral tab 54 is hinged to the wall 46 of locking member 43 and is provided with a recess 55 that engages below the top wall 45 of housing 33 to yieldingly hold the locking member in locked position (FIG. 3). Wall 45 includes an inclined surface 56 which facilitates movement of the tab into locking position. By grasping wall 46, the locking member 43 can be moved manually to an unlocked position. Inwardly extending ribs 57 on the inside surfaces of walls 47 of locking member 43 are adapted to engage longitudinally extending ribs 58 on the telescoping member to retain the locking member 43 when the locking member is moved to unlocked position. The walls 47 are adapted to flex past ribs 58 on initial assembly. The walls 47 of locking member 43 are provided with a downwardly extending slot 59 that engage ribs 60 on the inner surfaces of the side walls 61 of the housing 33 to guide the locking member 43 in its movement between locked position and unlocked position (FIG. 13).

Figure 4:
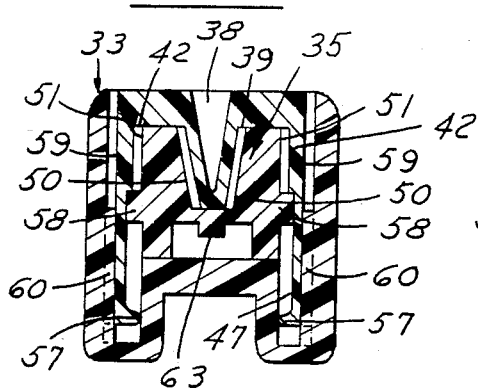
FIG. 4. is a fragmentary sectional view taken along the line 4—4 in FIG. 3.
Figure 5:
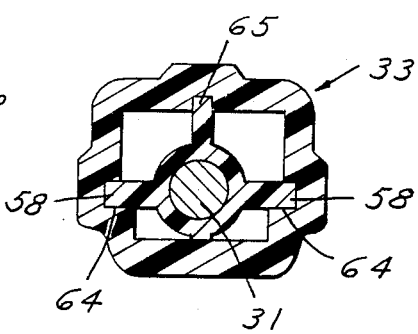
FIG. 5 is a sectional view taken along the line 5—5 in FIG. 3.
Figure 6:
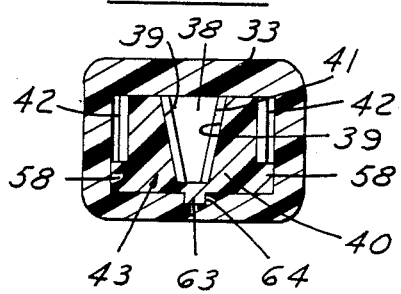
FIG. 6 is a sectional view taken along the line 6—6 in FIG. 3.

The telescoping member 35 is guided and supported at its first or forward portion by side ribs 58 which engage the side walls of the smaller portion of housing 33 (FIGS. 6, 19) and engage ribs 62 in the larger portion of housing 33 (FIGS. 4, 18). Telescoping member 35 also includes a longitudinally extending rib 63 on the bottom surface of the forward portion which engages a complementary groove in the small portion of housing 33 (FIG. 6). At the juncture of the telescoping member 35 and rod 31, ribs 58 are laterally enlarged to engage enlarged portions 64 of grooves 62 in the side walls of the enlarged portion of housing 33 (FIG. 5). An additional rib 65 on the top of telescoping member 35 engages a complementary groove 66.

In order to prevent inadvertent removal of the telescoping member 35 from housing 33, flexible tabs 68 project laterally outwardly and axially along end wall 67 on telescoping member 35 when it is inserted in the housing 33 and engage the teeth 41.

The telescoping member 35, housing 33 and locking number are made of relatively harder plastic such as glass filled nylon.

It can thus be seen that there has been provided an improved locking mechanism which is self-contained; which eliminates the need for any appendages, is compact, can be adjusted without the need for special tools, and will accommodate noise and vibration by a simple snap-on to an integral ball; which has minimal friction parts; wherein all the adjustment is achieved beyond the cable or conduit; which is capable of high tensile strength; which is small and compact; and which does not become disassembled during shipment.

We claim:

1. A manually controlled adjustable locking mechanism for a cable control system comprising
   a housing having a rectangular opening extending therethrough,
   a telescoping member having a rectangular cross section extending into and guided by the opening of said housing,
   said telescoping member having a first set of opposed internal transversely extending teeth and a second set of opposed external teeth,
   said housing having a rectangular opening extending transversely and intersecting said first-mentioned rectangular opening in said housing,
   a locking member having a substantially rectangular cross section positioned within the transverse opening and being manually movable between one position and another position,
   said locking member having a first set of teeth complementary to the internal teeth of the telescoping member and a second set of internal teeth complementary to the external teeth on the telescoping member in one position of the locking member and adapted to have the teeth disengaged from the telescoping member in said other position.

2. The manually controlled adjustable locking mechanism set forth in claim 1 including means for guiding the movement of said locking member.

3. The manually controlled adjustable locking mechanism set forth in claim 2 wherein said means includes grooves on the interior of said rectangular opening of said housing and complementary ribs on said locking member engaging the grooves on said housing.

4. The manually controlled adjustable locking mechanism set forth in claim 1 wherein said locking member is hollow and has an opening transversely therethrough through which the telescoping member extends.

5. The manually controlled adjustable locking mechanism set forth in claim 4 including means preventing inadvertent removal of the locking member.

6. The manually controlled adjustable locking mechanism set forth in claim 5 wherein said last-mentioned means comprises spring tabs on said telescoping member and a groove in said locking member such that the tabs normally engage said teeth but can be manually flexed to permit the locking member to be removed from said body.

7. The manually controlled adjustable locking mechanism set forth in claim 1 including a flange on the outer end of said locking member for manipulating said locking member.

8. The manually controlled adjustable locking mechanism set forth in claim 1 including means for preventing inadvertent disassembly of the telescoping member relative to said housing.

9. The manually controlled adjustable locking mechanism set forth in claim 1 including interengaging means between said housing and said locking member for yieldingly locking said locking member in locked position engaging said telescoping member.

10. The manually controlled adjustable locking mechanism set forth in claim 9 wherein said interengaging means comprises a spring tab on said locking member engaging a wall of said housing.

11. The manually controlled adjustable locking mechanism set forth in any of claims 1-10 wherein said housing, telescoping member and locking member are made of plastic.

* * * * *